United States Patent
Wang et al.

(10) Patent No.: US 10,482,645 B2
(45) Date of Patent: Nov. 19, 2019

(54) SYSTEM AND METHOD FOR AUGMENTED REALITY MAP

(71) Applicants: Xueqi Wang, Richardson, TX (US); Trusit Sandipbhai Shah, Richardson, TX (US)

(72) Inventors: Xueqi Wang, Richardson, TX (US); Trusit Sandipbhai Shah, Richardson, TX (US)

( * ) Notice: Subject to any disclaimer, the term of this patent is extended or adjusted under 35 U.S.C. 154(b) by 38 days.

(21) Appl. No.: 15/893,155

(22) Filed: Feb. 9, 2018

(65) Prior Publication Data

US 2019/0251719 A1    Aug. 15, 2019

(51) Int. Cl.
| | |
|---|---|
| *G06T 11/60* | (2006.01) |
| *H04W 4/02* | (2018.01) |
| *G01C 21/36* | (2006.01) |
| *G01C 21/34* | (2006.01) |
| *G06F 16/9535* | (2019.01) |
| *G06F 16/9537* | (2019.01) |

(52) U.S. Cl.
CPC .......... *G06T 11/60* (2013.01); *G01C 21/3476* (2013.01); *G01C 21/3644* (2013.01); *G01C 21/3647* (2013.01); *G06F 16/9535* (2019.01); *G06F 16/9537* (2019.01); *H04W 4/023* (2013.01)

(58) Field of Classification Search
None
See application file for complete search history.

(56) References Cited

U.S. PATENT DOCUMENTS

| | | | |
|---|---|---|---|
| 9,553,943 B1 * | 1/2017 | DeLuca | H04L 67/26 |
| 9,582,516 B2 * | 2/2017 | McKinnon | G06F 16/5866 |
| 9,918,319 B2 * | 3/2018 | Borenstein | H04W 4/021 |
| 2015/0109338 A1 * | 4/2015 | McKinnon | G06F 16/5866 345/633 |
| 2016/0029368 A1 * | 1/2016 | Borenstein | H04W 4/021 709/205 |
| 2017/0257739 A1 * | 9/2017 | Dal Santo | H04W 4/029 |
| 2019/0107935 A1 * | 4/2019 | Spivack | G06F 3/011 |
| 2019/0108682 A1 * | 4/2019 | Spivack | G06F 3/011 |
| 2019/0188916 A1 * | 6/2019 | Zhang | G06T 19/006 |

OTHER PUBLICATIONS

"MixedWalk: Explore Ahead Before Stepping in Mobile Augmented Reality Services", by Jun Lee, Kyoung-Sook Kim, Hirotaka Ogawa, and Yongjin Kwon, 2017 IEEE 6th International Conference on AI & Mobile Services, pp. 62-69, Sep. 11, 2017. (Year: 2017).*

* cited by examiner

*Primary Examiner* — James A Thompson
(74) *Attorney, Agent, or Firm* — Foley & Lardner LLP

(57) ABSTRACT

Systems and methods of augmented reality mapping are disclosed. Tags associated with collections of interest, areas of interest, and/or points of interest may be superimposed over a video feed of a user device. In response to movement of the user device a single tag associated with a collection of interest may replace a plurality of tags associated with a plurality of points of interest within the collection of interest.

12 Claims, 7 Drawing Sheets

SYSTEM AND METHOD FOR AUGMENTED REALITY MAP

FIELD

The present disclosure relates to mapping, and specifically a system and method for an augmented reality map.

BACKGROUND

Traditionally, maps are used to navigate among points in a context environment, such as a city, campus, venue, or building. In various instances, maps are difficult to use due to the presentation of much data in a small area, causing the maps to be printed relatively small. Moreover, maps are frequently difficult to use because a user must orient oneself relative to the context environment and the orientation of the map, as well as register one's location on a representative point of the map. Furthermore, maps, in various instances, impel users to pause and ascertain the data associated with the map, rather than moving about an area while simultaneously interacting with the map. These limitations hamper the ready and efficient use of map data.

SUMMARY

The forgoing features and elements may be combined in various combinations without exclusivity, unless expressly indicated herein otherwise. These features and elements as well as the operation of the disclosed embodiments will become more apparent in light of the following description and accompanying drawings.

An augmented reality mapping method is provided. The method may include determining, by a location sensor, a location of a user device, and providing, to a processor by a database, data representative of a collection of interest including a plurality of locations of interest, wherein a location of interest may include a point of interest, an area of interest, and/or a collection of interest within a threshold distance from the location of the user device to the processor. In various instances, the collection of interest includes a data set associated with further locations within the threshold distance from the location of the user device. The method may include computing, by the processor, a distance between a further location within the threshold distance and the location of the user device and determining, by the processor whether the distance is within a second threshold distance. In various embodiments, the method may include, in response to the distance being greater than the second threshold distance, directing, by the processor, a user interface of the user device to display a tag associated with the collection of interest, and monitoring by the user device the location sensor for an indication of a change in the location of the user device. In various embodiments, the method may include, in response to detecting by the user device the indication of the change in the location of the user device, computing by the processor a second distance between the further location within the threshold distance and the location of the user device subsequent to the change in the location. In various embodiments, the method may include, in response to the distance subsequent to the change in the location being lesser than a third threshold distance, directing, by the processor, the user interface of the user device to display a tag associated with a location of interest within the plurality of locations of interest.

In addition, the augmented reality mapping method may include wherein the processor includes a backend system processor of a backend system remotely disposed from the user device. Moreover, the augmented reality mapping method may include wherein the third threshold distance is greater than the second threshold distance. In various instances, the augmented reality mapping method may include wherein the third threshold distance is less than the second threshold distance. The collection of interest may contain at least one location of interest such as at least one point of interest, at least one area of interest, and at least one further collection of interest. Also, the location sensor may be selected from a group including: a GPS sensor, a radio signal strength detector sensor. Yet furthermore, in various instances, in response to a user interaction with the user device, the method includes directing, by the processor, the user interface of the user device to display the tag associated with the location of interest within the plurality of locations of interest and hide the tag associated with the collection of interest.

In certain embodiments of the augmented reality mapping method, the step of providing, by the database, data representative of the collection of interest further includes receiving, by a user device transceiver of a backend system, data representative of the location of the user device, providing, by the user device transceiver, the data to a backend system processor, querying, by the backend system processor, a remote data store including a collection of interest database, returning, by the remote data store an identification of collections of interest within the first threshold distance from the location of the user device, wherein the first threshold distance is set via a stored value, and providing, by the remote data store, data representative of the collection of interest including the plurality of locations of interest within the first threshold distance from the location of the user device to the processor.

In various configurations, the computing the distance between the further location within the threshold distance and the location of the user device includes comparing data representative of the location of the user device to retrieved data from a collection of interest database and calculating a difference.

Furthermore, certain configurations envision including depicting, by the user device, an overview overlay including a visual depiction of relative locations of points of interest and orientations thereof with respect to a direction of view. Yet further configurations envision including depicting, by the user device, a directional overlay including visual indicators associated with a navigable path to indicating a route to the at least one of the point of interest and the collection of interest.

An augmented reality mapping system is also provided. The system may contemplate a user device including a camera and processor and configured to generate a video feed of a context environment defining a field of view along a direction of view, a sensor associated with the user device and configured to provide at least one of location data and direction data to the user device associated with at least one of a location and the direction of view of the user device, and a backend system transceiver associated with the user device and configured to transmit the at least one of location data and direction data to a backend system. The system may contemplate wherein the backend system transceiver is further configured to receive from the backend system, at least one overlay including display elements associated with at least one of a collection of interest and a location of interest within the field of view, and the system may include a user display associated with the user device and configured to superimpose the at least one overlay and the video feed.

The augmented reality mapping system may also include further aspects such as wherein the user device is remotely disposed from the backend system. Moreover, the at least one overlay includes a tag associated with the collection of interest in response to the user device being a greater than a distance from the collection of interest. Furthermore, the system may include wherein the at least one overlay includes a tag associated with the location of interest and includes hiding the tag associated with the collection of interest in response to the user device translating to less than the distance from the collection of interest.

In various instances, the system includes a backend system and the backend system has at least a user data transceiver configured to receive, from a sensor, data representative a location of a user device and to provide, by a user device transceiver, the data to a backend system processor, wherein the backend system processor is configured to query a remote data store including a collection of interest database configured to return an identification of collections of interest within a first threshold distance from the location of the user device, wherein the first threshold distance is set via a stored value. In such a system, the remote data store provides data representative of a collection of interest including a plurality of locations of interest within the first threshold distance from the location of the user device to a processor.

The system may also further have a display element displayed by the user device and including an overview overlay including a visual depiction of relative locations of a location of interest and orientations thereof with respect to a direction of view.

Also, the system may further include a second display element displayed by the user device and including a directional overlay including visual indicators associated with a navigable path to indicating a route to the at least one of a location of interest and the collection of interest. In various embodiments, the sensor is selected from a group including: a GPS sensor, a radio signal strength detector sensor, and a compass.

Furthermore, an augmented reality mapping system is provided with at least a user device including a GPS sensor configured to detect a location of the user device operating within a context environment, and a transceiver configured to receive from a database, data representative of a collection of interest. In various instances, the collection of interest includes a data set associated with locations such as locations of interest within a first threshold distance from the location of the user device. The system may have a user device processor configured to receive a computed distance between at least one of the locations of interest such as a further location within the first threshold distance and the location of the user device and an indication of whether the computed distance is within a second threshold distance, and a user interface configured, in response to the computed distance being greater than the second threshold distance, to be directed by a processor to display a tag associated with the collection of interest. In various instances, the user device monitors the GPS sensor for an indication of a change in the location of the user device. In response to detecting by the user device the indication of the change in the location of the user device, the processor receives a computed second distance between the further location within the threshold distance and the location of the user device subsequent to the change in the location. In response to the computed second distance subsequent to the change in the location being lesser than a third threshold distance, the processor directs the user interface of the user device to display a tag associated with a point of interest within a plurality of locations of interest.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
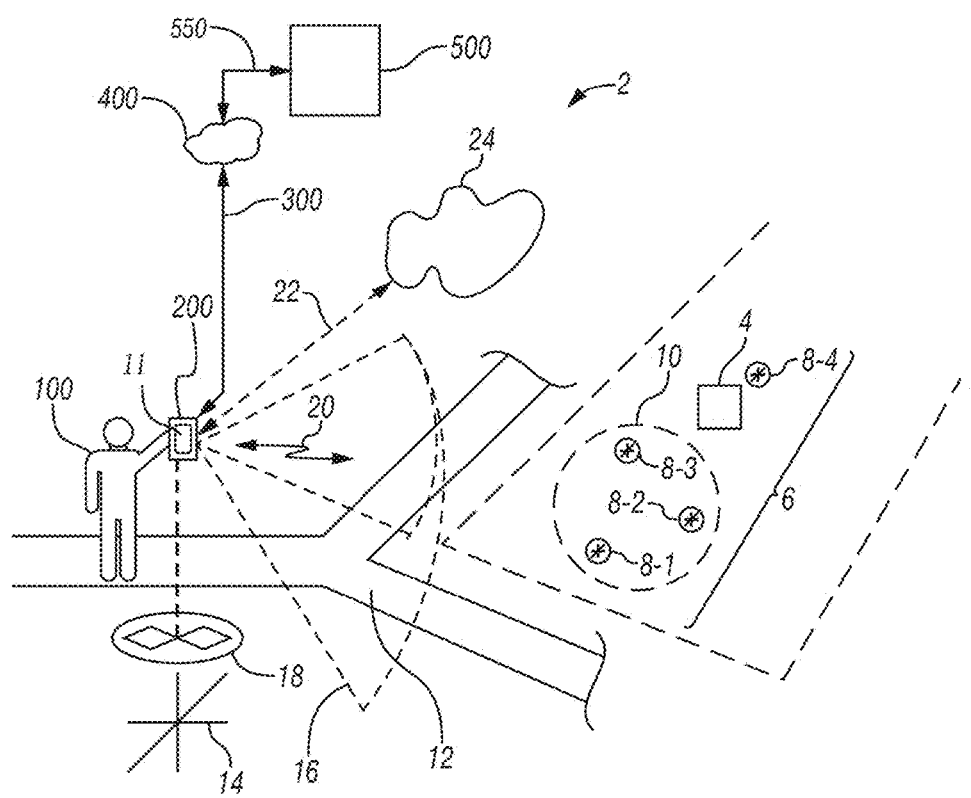
FIG. 1 illustrates an abstracted example context environment in connection with the use by a user of a system and method for augmented reality map, in accordance with various embodiments.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The utilization of augmented reality (AR) in maps can greatly enhance a user experience. For example, the association with tags with locations existing in a video feed from a camera may facilitate the navigation of a user holding the camera relative to the locations identified by tags. For instance, points of interest may be shown on a device screen, allowing a user to recognize the locations. However, within a user's field of view, there may be many points of interest that may clutter the screen display and render the display less useful due to the occlusion and clutter of the underlying camera view associated with the screen display. Thus, in various embodiments, an augmented reality map system and method may cluster points of interest together and represent them by a single tag associated with a common categorization of the clustered points of interest. For example, in a view of a faraway building, tags associated with each room in the building may be clustered together and represented by a single tag associated with the name of the building, rather than a cluttered display of many overlapping and adjacent tags. In a further example, a user visiting a zoo may point a device having a camera in a first direction. In the first direction far from the user, there may be a point of interest for a tree for a koala bear and an area of interest for a field for many kangaroos. However, in view of the user's relative distance from both the tree and the field, the tag associated with each may be hidden and a single tag for Australian animals displayed instead. Thus, the point of interest for a koala and the area of interest for kangaroos may be associated with a shared collection of interest for Australian animals.

In various embodiments, points of interest (POIs) and areas of interest (AOIs) may be grouped into collections of interest (COIs) for display on a user device in response to various different machine systems. For instance, geolocation data, compass data, certain characteristics associated with locations, and or the like may be implemented.

For further example, a collection of interest (COI) may contain multiple other collections of interest (COIs). For example, a shopping mall may have many different stores, restaurants, and attractions such as a skating rink. All stores, restaurants, and attractions may be collected in to a first-level collection of interest. Moreover, within the first-level collection of interest, a second-level collection of interest may exist containing every restaurant. A further second level collection of interest may exist containing every clothing store. A third collection of interest may contain a sub-set of clothing stores that may also have restaurants inside the clothing stores. In various embodiments the third collection of interest may further include stand-alone restaurants also. Thus, collections of interest may be nested, as desired. The various collections of interest may be variously displayed at various times, as may any areas of interest and points of interest depending on a user's geolocation, etc. In certain instances, multiple nested levels of point of interest, areas of interest, and collections of interest may appear in simultaneity. For example, to allow a user to see the location of points of interest within a collection of interest at the same time as seeing different collections of interest.

Moreover, as used herein, a "location of interest" refers to any of a point of interest, an area of interest, and a collection of interest. For example, a COI may include one or more location of interest within the COI, meaning that a COI may include further collections of interest, and/or points of interest, and/or areas of interest.

Furthermore, geolocation data may be combined with locations of interest, such as with the collections of interest, areas of interest, and points of interest to depict arrows, paths, and other instructions on the user device to guide the user to navigate to a desired collection of interest, area of interest, and/or point of interest. Still furthermore, interactive electronically depicted objects may be superimposed on the user device display in addition to collections of interest, areas of interest, and points of interest, such as to facilitate a virtual scavenger hunt, for instance- to assist users in memorizing geographic locations.

With reference now to FIG. 1, one example context environment 2 including a user 100 interacting with an augmented reality mapping system 3 is disclosed. A context environment 2 may include real-world ambient surroundings associated with a user's physical presence. A user 100 may be holding a user device 200 operable as a component of an augmented reality mapping system 3 and may interact therewith while moving about the context environment 2.

For example, an augmented reality map system may comprise a user device 200. A user device 200 may comprise a smartphone, a laptop, a tablet, a wearable device, a head-mounted device, a watch, and/or any other electronic data display and processing device as desired. For example, a user device 200 may comprise a smartphone running an Apple® operating system or an Android® operating system or any other operating system as desired. In various instances, the user device 200 comprises a camera having a field of view 16 directed in a direction of view 18. The user device 200 may further comprise location-sensing features, such as a compass to determine a direction and a GPS, or inertial navigation, or other system to register the user device 200 with respect to its location.

The user may hold the user device 200 with a direction of view 18. For instance, the user device 200 may be pointed so that a field of view 16 is pointed in a direction of view 18 associated with a compass angle. Moreover, the user 100 may hold the user device 200 in a device location 14. Thus, the user device 200 may have data representative of both its device location 14 and the direction of view 18 in which its camera is pointed, so that the field of view 16 may be electronically associated with spatial aspects of the larger context environment 2.

In FIG. 1, the field of view 16 is associated with a view input 20 comprising visual imagery, although in further instances, the view input 20 may comprise any further detectable directional data, such as RF radiation, thermal radiation, sound pressure levels, acoustical data such as sonar or ultrasound or any further input as desired.

The user device 200 may further receive third party context information 24 via a third party data feed 22. For example, third party context information 24 may comprise data related to the context environment 2. For example, third party context information 24 may comprise weather data, such that the user device 200 may compensate for the effects of fog, rain, darkness, and/or the like that may occlude the field of view 16, such as by facilitating the supplementation of the field of view 16 with analogous previously recorded data, such as image data from a prior point in time without the occluded field of view 16. Thus, a synthetic vision feature may be provided.

The user device 200 may be connected to a network 400 via a user device data channel 300. A user device data channel 300 may comprise a cellular data connection. In further instances, a user device data channel 300 may comprise a Wi-Fi data connection. In yet further instances, a user device data channel 300 may comprise any electromagnetic, radio frequency, sonic, optical, mechanical, and/or other communication mechanism whereby the user device 200 is operatively connected to interchange data with a network 400.

The network 400 may comprise the internet. In further instances, the network 400 may comprise an intranet, or a proprietary communication system, or an RF network, or a ZigBee network, or a mesh network, or a ring network, or any network architecture as desired.

The network 400 may connect to a backend system 500 via a backend system data channel 550. The backend system data channel 550 may comprise a cellular data connection. In further instances, a backend system data channel 550 may comprise a Wi-Fi data connection. In yet further instances, a backend system data channel 550 may comprise any electromagnetic, radio frequency, sonic, optical, mechanical, and/or other communication mechanism whereby the backend system 500 is operatively connected to interchange data with a network 400.

The backend system 500 was briefly referenced above. In various embodiments the backend system 500 may comprise a processor and memory that interacts with the user device 200. For example, the user device 200 may have a variety of associated sensors that collect data about the context environment 2. The processing of this data may require significant amounts of computing power and it may be desired to perform this processing away from the user device 200 such as to limit burden on user device batteries, and/or other user device limitations. Moreover, the backend system 500 may combine data from the user device 200, such as from sensors, with data from third party sources, such as event-specific map data provided by venues, or other data related to points of interest, areas of interest, and collections of interest, which may be static and/or may change over time, or may be in active movement. Furthermore, computations associated with mapping, determining and providing directions to an area of interest, collection of interest, and/or point of interest, or data associated with timing and/or display elements 11 may be combined with the data from the user device 200, structured, and transmitted by the backend system 500 to the user device 200 for further utilization.

For example, a user 100 may be traveling a navigable path 12 with a user device 200 displaying display elements 11 on a display. Points of interest 8, areas of interest 4, collection of interest 10 and/or other target locations of a target location set 6 come into a field of view of a view input 20 of a user device 200 as the user 100 moves the device to a device location 14 having a direction of view 18. The user device 200 may receive view input 20 and/or other data from onboard sensors, and in communication with the backend system 500, illustrate display elements 11 on the user device 200 to communicate relevant information to the user 100. For example, tags identifying in human-readable form the points of interest 8, areas of interest 4, and collections of interest 10 may be provided, and depending on a distance of a user 100 from points of interest 8, areas of interest 4, and collections of interest 10, different POIs 8, AOIs 4 and COIs 10 may be consolidated so that a single representative tag is displayed. For example, many far away POIs 8 may be within a single far away COI 10, so that it is useful to display a tag associated with the single far away COI 10 rather than an overlapping clutter of tags for each POI 8. As a user device 200 moves closer to the COI 10, a threshold may be reached at which the tag for the COI 10 is removed from the display of the user device 200 and instead display elements 11 associated with tags for all or part of the POIs 8 may be displayed instead.

Figure 2A:
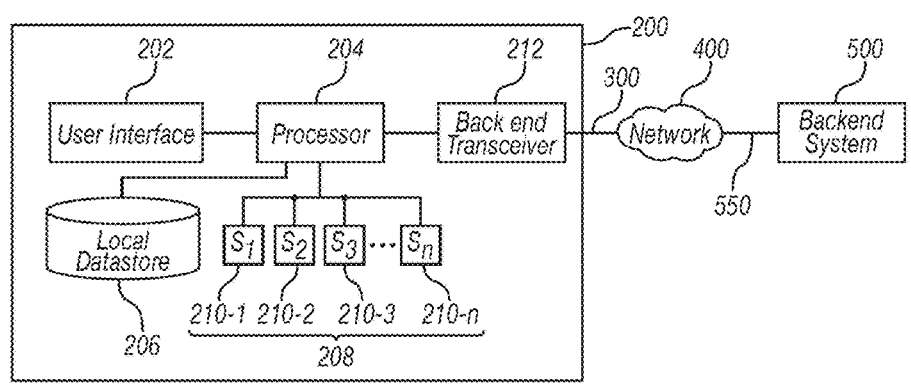
FIG. 2A illustrates aspects of a user device for an augmented reality map system, in accordance with various embodiments.

With reference now to FIG. 2A, specific aspects of a user device 200 are discussed in detail. For example, a user device 200 may comprise a user interface 202. A user interface 202 may comprise a graphical application display, or may comprise a sound interface, such as utilizing text-to-speech technology to direct a user 100 in navigation or other tasks, or may comprise a tactile display, such as vibrating to alert a user 100 to take an action, such as vibrating twice to indicate an approaching right turn and vibrating once to indicate an approaching left term, and/or may include any further mechanism or combination of mechanisms to effectuate a machine-to-human interface. In various embodiments, the user interface 202 comprises a graphical display screen of a smart phone.

The user device 200 may comprise a processor 204. A processor 204 may comprise a general purpose computer processor, or may comprise an application specific integrated circuit (ASIC) or may comprise a field programmable gate array (FPGA), or may comprise a microcontroller, or may comprise any computing device configured to solicit, receive, process, and/or transmit data and prepare display elements 11 for display to a user 100 in response to the data.

The user device 200 may comprise a local data store 206. A local data store 206 may have private and public partitions and may be a repository for data for use by the processor 204. For example, a local data store 206 may comprise a private partition including machine instructions for the processing of input from a sensor array 208 to create a display element 11 for display to a user 100, and may include a public partition including configuration data such as for configuration of a sensor array 208. The local data store 206 may be implemented as a real-time buffer for processor 204 operations, and further may be implemented as long term storage such as for data that remains static from use to use, or is updated only periodically. In various embodiments, the local data store 206 is a logical aspect of a cloud-storage system, such as may be provided by a third party, for instance, the provider of the operating system on the user device 200.

The user device 200 may further comprise a sensor array 208 comprising a plurality of sensors, such as a first sensor 210-1, a second sensor 210-2, and any number 'n' of sensors, such as an $N^{th}$ sensor 210-$n$. In various instances, the sensors comprise data inputs to the processor 204 that are relevant to the context environment 2. For example, one or more sensor 210-1, 210-2, 210-$n$ may comprise a temperature sensor, a camera, a GPS, a compass, an altimeter, a clock, an inertial measuring unit (IMU), a gyroscope, an accelerometer, an orientation detector, and/or the like. In various instances one or more sensor 210-1, 210-2, and 210-$n$ may comprise a signal strength detector such as to determine location in response to signal strength or received signals and/or a timing detector such as to determine location in response to timing of received signals, and/or a Doppler shift detector, such as to determine velocity in response to a Doppler shift of received signals.

For example, a user device 200 may include a first sensor 210-1 comprising a GPS, a second sensor 210-2 comprising a compass, and a third sensor 201-3 comprising a camera. The processor 204 may utilize the third sensor 201-3 comprising a camera to obtain view input 20 of a field of view 16 and in connection with the backend system 500 identify points of interest, areas of interest, and collections of interest present within the field of view 16. The processor 204 may utilize the second sensor 210-2 comprising a compass to facilitate registration of direction of view 18 of the field of view 16 and the points of interest, areas of interest, and collections of interest to electronic data representative of a direction vector on a map. Finally, the processor 204 may utilize the first sensor 210-1 comprising the GPS to register the relative location of the user device 200 relative to electronic data representative of a coordinate location on a map, such as relative to points of interest, areas of interest, and collections of interest. In this manner, the sensor array 208 may provide data to the processor 204 in order to locate areas of interest, collections of interest, and points of interest, and in connection with the backend system 500, assign proper tags to locations of interest, such as the areas of interest, collections of interest, and points of interest and decide which tags to display and which tags to refrain from displaying.

Finally, the user device 200 may comprise a backend transceiver 212. A backend transceiver may translate and structure data from the processor 204 to backend system 500 and from the backend system 500 to the processor 204. For instance, the backend transceiver 212 may comprise a cellular data transceiver configured to send and receive data via a user device data channel 300 such as a cellular data connection to a network 400. The network 400 may connect to a backend system data channel 550, such as a packet switched TCP/IP data network, or any network as desired which interfaces with the backend system 500. In this manner, the user device 200 communication via the backend transceiver 212 with a backend system 500 to facilitate preparation of display element 11 (FIG. 1) on the user interface 202.

Figure 2B:
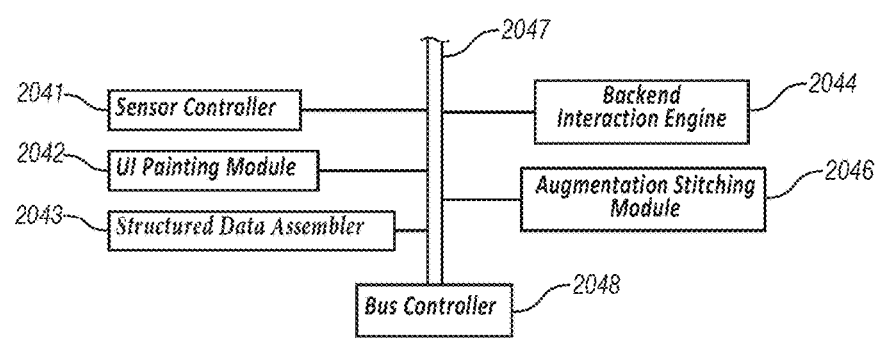
FIG. 2B illustrates aspects of a processor of a user device according to FIG. 2A, in accordance with various embodiments.

Consequently, the processor 204 may itself comprise various subcomponents. With reference to FIGS. 1 and 2A, but with further reference to FIG. 2B, a processor 204 may comprise logical divisions which may perform different tasks. While processor 204 is depicted with logical modules in connection to a bus 2047 under control of a bus controller 2048, one may appreciate that while in some instances bus 2047 may be a physical bus, in further instances bus 2047 may comprise a logical bus operative within processor 204 and in connection with local data store 206 to facilitate machine operations.

In various embodiments, the processor 204 may comprise a sensor controller 2041. A sensor controller 2041 comprises a module configured to control the operation of a sensor array 208, such as a first sensor 210-1, a second sensor 210-2, a third sensor 210-3, and any number 'n' sensors such as an $N^{th}$ sensor 210-n. For example, the sensor controller 2041 may interrogate sensors, such as by polling them. In further embodiments, the sensor controller 2041 may interoperate in an interrupt driven manner with sensors, whether triggering interrupts by the sensors and/or catching interrupts from the sensors. In yet further embodiments, the sensor controller 2041 may poll some sensors, such as a first sensor 210-1 comprising a GPS to solicit periodic device location 14 updates and the sensor controller 2041 may catch interrupts from other sensors, such as a second sensor 210-2 comprising a compass to identify and respond to a sudden change by a user 100 of the direction of view 18 of the user device 200. In various embodiments, the sensor controller 2041 may include data representative of the respective sensor's sensor types and the expected contents and formatting of data to and from each sensor of each sensor type.

The sensor controller 2041 may interoperate with a structured data assembler 2043. A structured data assembler 2043 may assemble data received from a sensor array 208 and structure it for provision by a backend interaction engine 2044 to a backend system 500. Following interpretation of the data by the backend system 500, the backend interaction engine 2044 may return further data representative of display elements 11 for display on a user interface 202 of the user device 200. In that instance, the structured data assembler 2043 may ingest the received further data and structure the received further data for provision to a user interface 202. In this manner, the structured data assembler 2043 may identify the contents and type of data fields and assemble groups of data fields for transmission to and from and utilization by, other aspects.

The processor 204 may also have a backend interaction engine 2044, as mentioned. The backend interaction engine 2044 may interoperate with other aspects of the processor 204 to transceive communications with the backend system 500. In this manner, a logical interconnection to the backend system 500 may be manifested.

Furthermore, the processor 204 may comprise an augmentation stitching module 2046. The augmentation stitching module 2046 may combine received further data provided by the backend interaction engine 2044 from the backend system 500 with data from the sensor controller 2041 representative of a context environment 2. The augmentation stitching module 2046 may combine display elements 11 associated this various data and prepare overlays made up of display elements 11 to be displayed on a user device 200. For example, the augmentation stitching module 2046 may prepare overlays of display elements 11 related to points of interest, areas of interest, collections of interest, temporal, and other aspects, and may combine these with data representative of the view input 20. This combined data set may be provided to the UI painting module 2042 for display on a user device 200.

The UI painting module 2042 may interoperate with the augmentation stitching module 2046 to create a human-readable depiction, such as visually on a user device 200. In this manner, a human-to-machine interface is effectuated.

Figure 3A:
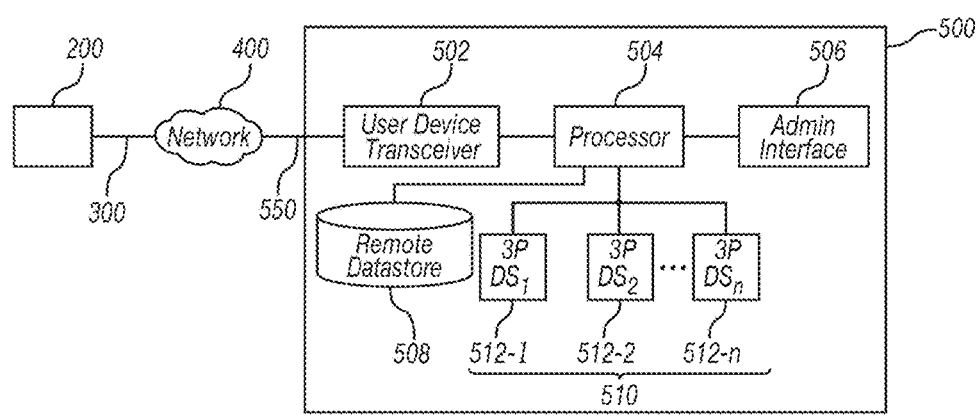
FIG. 3A illustrates aspects of a backend system of an augmented reality map system, in accordance with various embodiments.

Having discussed the processor 204 of the user device 200 in detail, attention is now directed to FIG. 3A to discuss the backend system 500 in greater detail. In various embodiments, the backend system 500 interoperates with the user device 200 to prepare display elements 11 for display on the user device 200 in connection with the view input 20 provided by the user device 200.

For example, a backend system 500 may comprise a user device transceiver 502. The user device transceiver 502 may comprise a module configured to translate and structure data from backend system 500 to user device 200 and from user device 200 to the backend system 500. For instance, the user device transceiver 502 may comprise a cellular data transceiver configured to send and receive data via a backend system data channel 550, a network 400, and a user device data channel 300, to the user device 200. In this manner, the backend system 500 communicates via the user device transceiver 502 to facilitate preparation of display element 11 (FIG. 1) on the user interface 202.

A backend system 500 may comprise a backend processor 504. The backend processor 504 may be configured to solicit/receive data from a user device 200 via the user device transceiver 502 and may be configured to solicit/receive data from other sources, such as a remote data store 508 and/or a third party data feed set 510 and process this data to provide instructions to a user device 200 regarding the display of display elements 11. For instance, the backend processor 504 may comprise a general purpose computer processor, or may comprise an application specific integrated circuit (ASIC) or may comprise a field programmable gate array (FPGA), or may comprise a microcontroller, or may comprise any computing device configured to solicit, receive, process, and/or transmit data and prepare display elements 11 for display to a user 100 in response to the data.

The backend system 500 may comprise an administration interface 506. An administration interface 506 may comprise a user interface 202 configured to permit an administrative user to add, remove, change, and otherwise manipulate points of interest, areas of interest, and collections of interest as desired. For example, the owner of a venue may add points of interest related to food, and may remove points of interest related to employee-only access areas.

As briefly mentioned, the backend system 500 may comprise a third party data feed set 510. The third party data feed set 510 may comprise a plurality of third party data sources useful for preparation of display elements 11. For example, the third party data feed set 510 may comprise any number of third party data sources, such as a first third party data feed 512-1, a second third party data feed 512-2, and any number 'n' of third party data feeds, such as a $N^{th}$ third party data feed 512-n. In various embodiments, these may include aspects such as data related to a venue, such as for an amusement park, data related to line times for different rides in the amusement park, or may include data related to the movement of points of interest, such as animals within an area of interests, such as a field, or may include weather data, such as data related to the ambient conditions of a context environment 2 such as to facilitate synthetic vision, and/or data related to an expected view input 20, to provide for synthetic vision or to facilitate the comparison of view input 20 from a first time to a second time.

Finally, the backend system 500 may comprise a remote data store 508. For instance, a remote data store 508 may comprise a memory, or a distributed memory such as a cloud storage mechanism, or any further device whereby electronic data is stored for later retrieval. For example, a remote data store 508 may comprise historical data related to the provision of display elements 11 on user devices 200 such as to enhance and improve future operations, for example, comparing mapping directions provided to actual routes taken in order to improve mapping functions or the provision of accurate directions.

Figure 3B:
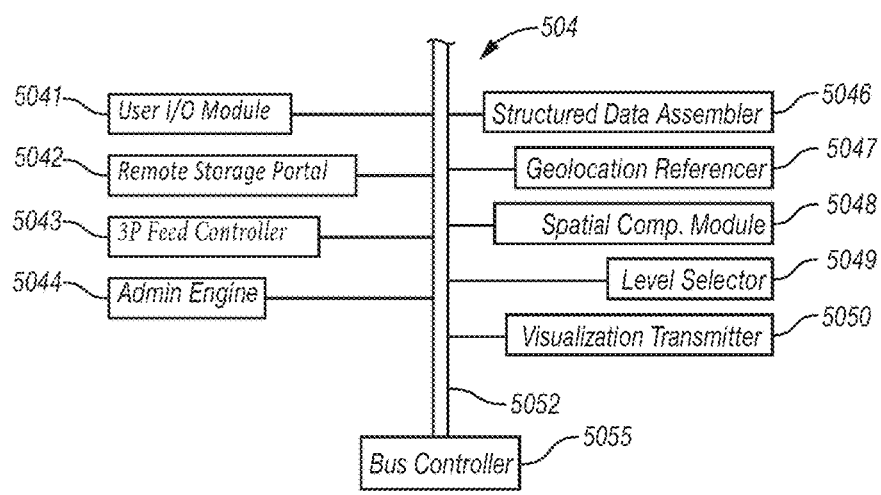
FIG. 3B illustrates aspects of a processor of a backend system of an augmented reality map system, in accordance with various embodiments.

Now, and with reference to FIG. 3B, aspects of the backend processor 504 are discussed in further detail. The backend processor 504 may comprise a plurality of logical modules in connection to a backend bus 5052 under control of a bus controller 5055. While in various instances the backend bus 5052 is a physical bus, in other instances, it is a logical aspect representative of operations performed by the backend processor 504.

In various embodiments, the backend processor 504 may comprise a user I/O module 5041. The user I/O module 5041 comprises a logical division of the backend processor 504 configured to transceive data from and among other backend processor aspects 504 to the user device 200 via the user device transceiver 502.

The backend processor 504 may comprise a remote storage portal 5042. A remote storage portal 5042 may be configured to transceive data from and among other backend processor aspects 504 to the remote data store 508. In this manner, the backend processor 504 controls the storage and retrieval of data from the remote data store 508.

The backend processor 504 may comprise a third party feed controller 5043. The third party feed controller 5043 may comprise a module configured to control the operation of a third party data feed set 510. For example, third party feed controller 5043 may be configured to control any number of third party data sources, such as a first third party data feed 512-1, a second third party data feed 512-2, and any number 'n' of third party data feeds, such as a $N^{th}$ third party data feed 512-n. The third party feed controller 5043 may interrogate third party data feeds, such as by polling them. In further embodiments, the third party feed controller 5043 may interoperate in an interrupt driven manner with third party data feeds, whether triggering interrupts by the third party data feeds and/or catching interrupts from the third party data feeds. In yet further embodiments, the third party feed controller 5043 may poll some third party feeds, such as a first third party data feed 512-1 comprising a ride wait time data source providing wait times for different rides in an amusement park and the sensor controller 2041 may catch interrupts from other third party data feeds 512-2, such as a third party data feed 512-2 comprising a source of ride closure information to identify ride closures for different rides in an amusement park. In various embodiments, the third party feed controller 5043 and or remote data store 508 may include data representative of the respective data feed types and the expected contents and formatting of data to and from each data feed of each data feed type.

The backend processor 504 may comprise an administration engine 5044. An administration engine 5044 may coordinate access by authorized administrators to an administration interface 506. For example, the administration engine 5044 may compare a solicitation for data transmitted by a putative administrator via an administration interface 506 to actual permissions associated with the solicited data, and transmit only that data for which the putative administrator has valid access. In this manner, unauthorized access via the administration interface 506 may be limited.

The backend processor 504 may comprise a structured data disassembler 5046. The structured data disassembler 5046 may perform the conjugate operation of the structured data assembler 2043. The structured data disassembler 5046 may disassemble assemble data received from a user device 200 and separate the packaged data for processing by the different modules of the backend processor 504, such as extracting data from the different sensors of the sensor array 208 and separating it for provision to the geolocation referencer 5047, the spatial computation module 5048, the level selector 5049 and other aspects of the backend processor 504 as desired. For example, GPS data may be provided to the geolocation referencer 5047, compass data may be provided to the spatial computation module 5048, calculated distances from the different areas of interest, collections of interest, and points of interest may be provided by/to the level selector 5049 (whether calculated by the backend processor 504 or the user device processor 204). The structured data disassembler 5046 may unpackage data received from the user device 200 representative of interactions by the user 100 with the user interface 202 of the user device 200 for storage by the remote storage portal 5042. In this manner the structured data disassembler 5046 may identify the contents and type of data fields and disassembles groups of data fields for processing, storage, and utilization by other aspects.

The backend processor 504 may include a geolocation referencer 5047. The geolocation referencer 5047 may receive data representative of a geographic location of a user device 200, such as GPS data, and may compare this data to stored map data retrieved by the remote storage portal 5042 from a remote data store 508. The geolocation referencer 5047 may reference this geolocation data to the stored map data to assign a location relative to other map aspects, such as collections of interest, areas of interest, and points of interest, in order to provide to the user device 200 display elements 11 representative of the assigned location relative to other map aspects.

The backend processor 504 may include a spatial computation module 5048. The spatial computation module 5048 may receive data representative of a compass orientation of a user device 200, such as compass data, and may compare this data to stored map date retrieved by the remote storage portal 5042 from a remote data store 508. The spatial computation module 5048 may reference this compass data to the stored map data to assign an orientation relative to other map aspects, such as collections of interest, areas of interest, and points of interest, in order to provide to the user device 200 display elements 11 representative of the orientation of the user device 200 relative to other map aspects.

The backend processor 504 may comprise a level selector 5049. A level selector 5049 comprises a module to receive geolocation data from the geolocation referencer 5047 and compass data from the spatial computation module 5048, as well as retrieved collections of interest, areas of interest, and points of interest retrieved from the remote storage portal 5042. The level selector 5049 thus determines which of the collections of interest, areas of interest, and points of interest to display and which to hide. For example, a collection of interest may contain multiple points of interest. The level selector 5049 may direct the user I/O module 5041 to cause the user device 200 to display a single tag representing the collection of interest when the geolocation referencer 5047 indicates that a user device 200 is greater than a first distance threshold from at least one point of interest within the collection of interest. The level selector 5049 may direct the user I/O module 5041 to cause the user device 200 to display a plurality of tags, each associated with a point of interest from within the collection of interest in response to the geolocation referencer 5047 indicating that the user device 200 is within a second distance threshold from at least one point of interest within the collection of interest. In various embodiments the second distance threshold is equal to the first distance threshold, while in further instances, it is different than the first distance threshold, such as to invoke hysteresis when a user device 200 is proximate to the threshold to prevent rapid switching and/or race states from occurring.

The backend processor 504 may comprise a visualization transmitter 5050. The visualization transmitter 5050 may interoperate with all the other modules of the backend processor 504 to assemble a set of display elements 11 for representation on a user device 200. By assembling the relevant display elements 11, the computational load on the user device 200 may be reduced, such as by performing the preparation of display elements 11 associated with points of interests, areas of interest, and collections of interest on the backend processor 504, then transmitting the results of the computations to the user I/O module 5041 for provision to the user device 200.

Figure 4:
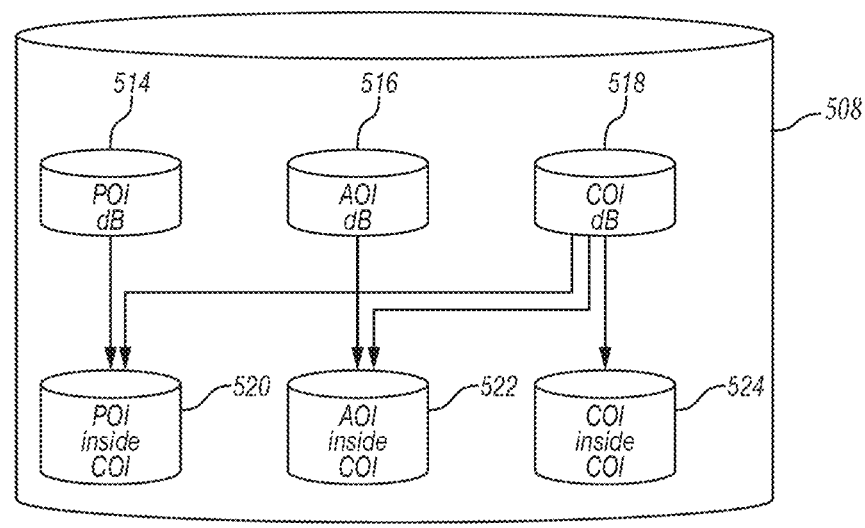
FIG. 4 illustrates aspects of a remote data store of a backend system of an augmented reality map system, in accordance with various embodiments.

Brief mention was previously made of the ability of the backend system 500 in conjunction with the user device 200 to select which from among a set of collections of interest, areas of interest, and points of interest to display. In order to facilitate this selection, the backend system 500 structures various data to represent real world relationships extant between such collections of interest, areas of interest, and points of interest. For example, and with reference to FIGS. 1-3B and with specific reference to FIG. 4, the remote data store 508 may comprise a plurality of further databases that are structurally linked.

For example, the remote data store 508 may comprise points of interest database 514. A points of interest database 514 may comprise one or more table including a tag (e.g., a text string) and data representative of a geographic location of a point in space for potential indication on a user device 200.

The remote data store 508 may comprise an area of interest database 516. An area of interest database 516 may comprise one or more table including a tag (e.g., a text string) and data representative of a geographic location of an area in space for potential indication on a user device 200.

The remote data store 508 may comprise a collection of interest database 518. A collection of interest database 518 may comprise one or more table including a tag (e.g., a text string) and data representative of a geographic location of a collection of other points and/or areas in space for potential indication on a user device 200.

The remote data store 508 may comprise a point(s) of interest inside collection(s) of interest database 520 ("POI inside COI database" 520). The POI inside COI database 520 may comprise one or more table including data representative of a relationship between one or more point of interest stored in the points of interest database 514 and one or more collection of interest stored in the collection of interest database 518. In this manner, the nesting of points of interest within a collection of interest may be identified.

The remote data store 508 may comprise an area(s) of interest inside collection(s) of interest database 522 ("AOI inside COI database" 522). The AOI inside COI database 522 may comprise one or more table including data representative of a relationship between one or more area of interest stored in the areas of interest database 516 and one or more collection of interest stored in the collection of interest database 518. In this manner, the nesting of areas of interest within a collection of interest may be identified.

The remote data store 508 may comprise a collection of interest inside collection(s) of interest database 524 ("COI inside COI database" 524). The COI inside COI database 524 may comprise one or more table including data representative of a relationship between one or more collection of interest stored in the collections s of interest database 516 and one or more collection of interest stored in the collection of interest database 518. In this manner, the nesting of areas of interest within a collection of interest may be identified.

Figure 5:
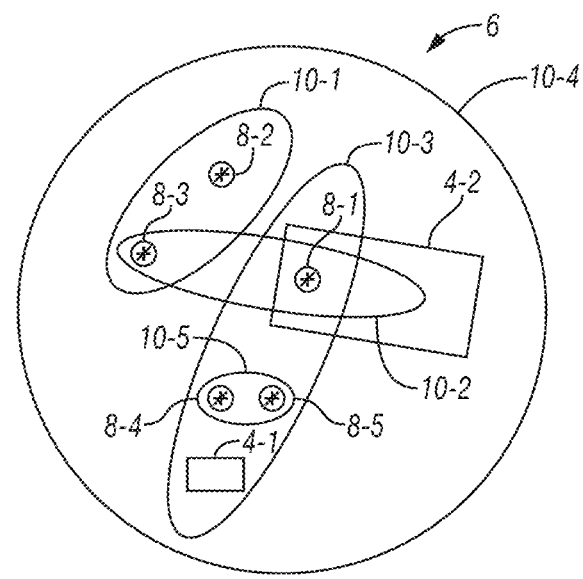
FIG. 5 illustrates an example target location set, in accordance with various embodiments.

Thus, with reference to FIGS. 1-4 and additional reference to FIG. 5, one may appreciate that the remote data store 508 may comprise a repository of a target location set 6. A target location set 6 includes all potential taggable locations depictable on a user device 200 such as many locations of interest. For example, a target location set 6 may include points of interest 8, areas of interest 4 and collections of interest 10.

As illustrated, in one example target location set, such as a first target location set 6-1, a first point of interest 8-1, second point of interest 8-2, third point of interest 8-3, fourth point of interest 8-4, and fifth point of interest 8-5 may exist within the target location set 6-1. Each such point of interest may be associated with a single location. Each such point of interest may be stored in the point of interest database 514.

As also illustrated, there may exist an area of interest, such as first area of interest 4-1 and a second area of interest 4-2. Of note is the depiction of second area of interest 4-2 residing within both a second collection of interest 10-2, in part, a third collection of interest 10-3, in part, and a fourth collection of interest, 10-4 in whole. Thus, in various embodiments, the remote data store 508 may further include data representative of which portion of one aspect of interest is within another aspect of interest, and to what extent such portions overlap. Each area of interest, such as first area of interest 4-1 and second area of interest 4-2 may be stored in the areas of interest database 522. Each area of interest, such as first area of interest 4-1 and a second area of interest 4-2 may be associated with a region.

There may exist a variety of collections of interest. For example, a first collection of interest 10-1, a second collection of interest 10-2, a third collection of interest 10-3, a fourth area of interest, 10-4, and a fifth area of interest 10-5 may exist within the target location set 6. Each such collection of interest may be stored in the collection of interest database 518. Each such collection of interest may include a variety of other collections of interest, areas of interest, and points of interest. For example, a first collection of interest 10-1 may include a second point of interest 8-2, and a third point of interest 8-3. Thus, depending on a distance of a user device 200 from the first collection of interest 10-1 in various embodiments a single tag representing the first collection of interest 10-1 may be depicted or alternatively a tag representing the second point of interest 8-2 and another tag representing the third point of interest 8-3 may be depicted. Moreover, the second collection of interest may comprise a third point of interest 8-3 and a first point of interest 8-1. Thus, one may appreciate that points of interest may belong to multiple collections of interest. For instance, in response to a filter setting on a user device 200, in various instances, one or both collections of interest, first collection of interest 10-1 and second collection of interest 10-2 may be depicted. There may also be a third collection of interest 10-3 such as may contain an aspect of a second area of interest 4-2, a fourth point of interest 8-4 and a fifth point of interest 8-5, a first area of interest 4-1, and further collections of interest, such as a fifth collection of interest 10-5, which may itself contain the fourth and fifth points of interest 8-4, 8-5. Finally, a fourth collection of interest 10-4 is depicted containing each of the other described aspects of the target location set 6.

Consequently, one may then appreciate that the POI inside COI database 520 may contain data representing the relationship between points of interest and collections of interest, such as showing that fourth point of interest 8-4 and fifth point of interest 8-5 are within the fifth collection of interest 10-5.

Furthermore, one may appreciate that the AOI inside COI database 522 may contain data representing the relationship between areas of interest and collections of interest, such as showing that the first area of interest 4-1 is within the third collection of interest 10-3 and/or also showing that the second area of interest 4-2 is wholly within the fourth collection of interest 10-4, partially within the third collection of interest 10-3, and also partially within the second collection of interest 10-2.

Still further, one may appreciate that the COI inside COI database 524 may contain data representing the relationship between collections of interest, such as showing that the fifth collection of interest 10-5 is within the third collection of interest 10-3, and similarly that the second collection of interest 10-2 is partially within the first collection of interest 10-1, partially within the third collection of interest 10-3, and wholly within the fourth collection of interest 10-4.

Figure 6:
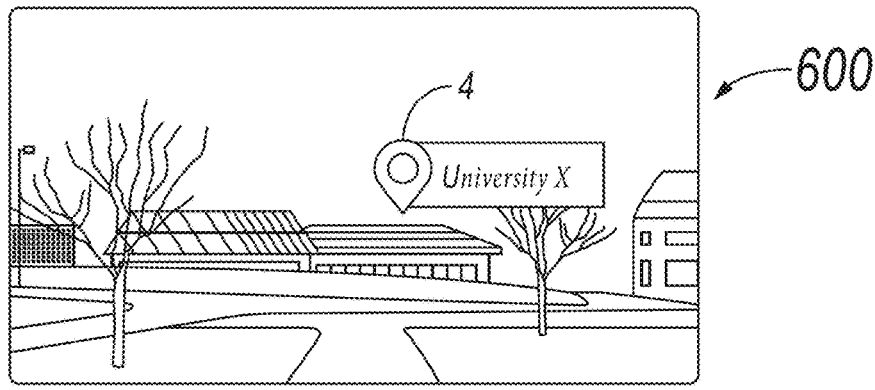
FIG. 6 illustrates display elements associated with a first level screen overlay, in accordance with various embodiments.
Figure 7:
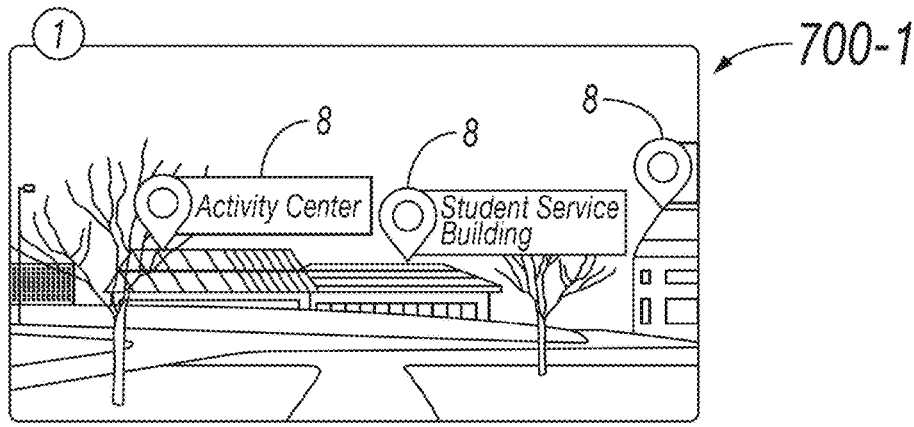
FIGS. 7-8 illustrate display elements associated with second level screen overlays, in accordance with various embodiments.
Figure 8:
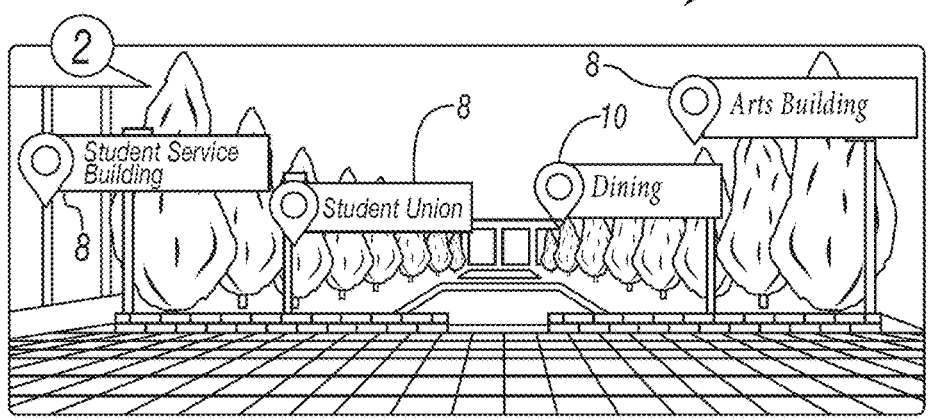

Having discussed various operative structures of the augmented reality mapping system 3, attention is directed to FIGS. 6-8, in addition to ongoing attention to FIGS. 1-5, for a discussion of different screen overlays formed of display elements 11 and displayable on a user device 200 in response to the operation of the augmented reality mapping system 3.

For example, there may exist a first level screen overlay 600 and a second level screen overlay 700. A screen overlay comprises a combination of display elements 11 in connection with image data from a sensor of a user device 200 such as a camera. For example, with reference to FIG. 6, a user device 200 may be a first distance from a collection of interest 10. In response to a determination that the user device 200, via a sensor such as a GPS sensor is calculated to be a first distance from the collection of interest 10, the backend system 500 may direct the user device 200 to display a tag associated with the collection of interest 10.

As the user 100 approaches nearer to the collection of interest 10, the user device 200, via a sensor such as a GPS sensor, may indicate a change in the distance from the collection of interest 10 to a backend system 500. In response to an indication that the user device 200 has a second location, the backend system 500 may recalculate the distance of the user device 200 to the collection of interest 10 and ascertain that the user device 200 is less than a second distance from the collection of interest 10 (which in various instances may be equal to the first distance, but in other instances may be different to provide for hysteresis). In response, the backend system 500 may indicate to the user device 200 to transition to a second level screen overlay 700-1 (FIG. 7). Alternatively, in various embodiments, the backend system 500 may indicate to the user device 200 to transition to a second level screen overlay 700-1 (FIG. 7) in response to other stimuli rather than indications of changes in distance. For example, a user may interact with the user device, such as providing input via a user interface representative of an instruction to transition to a second level screen overlay 700-1 (FIG. 7).

More specifically, in connection with a transition to a second level screen overlay 700-1 (FIG. 7), the backend system 500 may retrieve tags associated with points of interest with in the collection of interest 10. The backend system 500 may instruct the user device 200 to hide the tag associated with the collection of interest 10, and display the plurality of tags associated with the points of interest 8 and the areas of interest 4.

Moreover, a user 100 may turn the user device 200, such that a sensor, for instance a compass, of the user device 200 determines that the view input 20 now detects a different field of view 16 within a device location 14 corresponding to the direction of view 18 changing. Consequently, the user device 200 may interoperate with a backend system 500 to cause the user device 200 to display different points of interest 8 within new field of view, and moreover, in various embodiments, to display a further collection of interest 10, for instance, a collection of interest 10 associated with a building having further points of interest 8 therein. Thus, a further second level screen overlay 700-2 (FIG. 8) may be represented on the user device 200.

With reference to FIGS. 6-8, in various embodiments, one example arrangement of display elements 11 consistent with a first level screen overlay 600 may show tags. An arrangement of display elements 11 consistent with a second level screen overlay 700-1 or further second level screen overlay 700-2 may include tags. Consequently, each of the first level screen overlay 600 and the second level screen overlay 700 and further second level screen overlay 700-2 may depict a so called "target location overlay 23", which will be discussed further herein.

Figure 9:
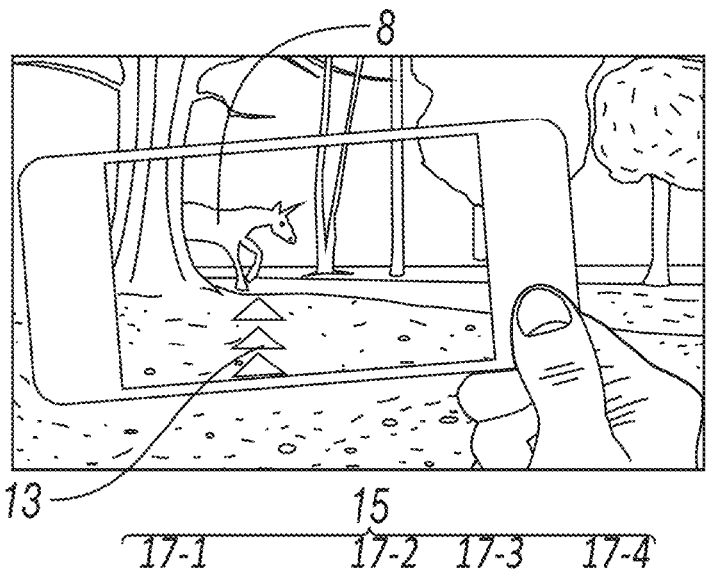
FIG. 9 illustrates display element associated with a directional overlay for a navigable path, in accordance with various embodiments.
Figure 10:
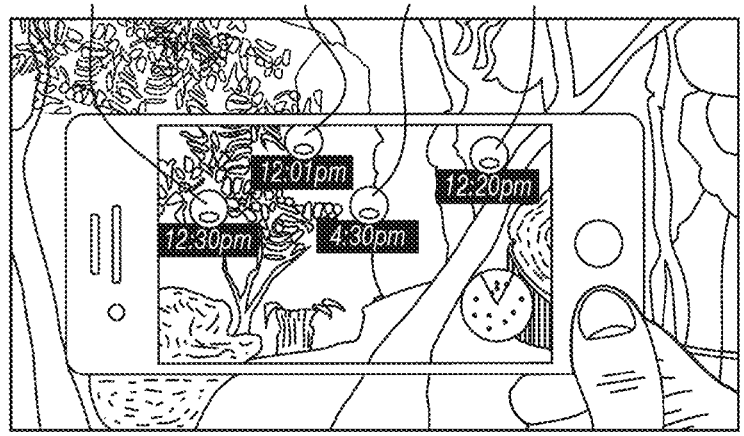
FIG. 10 illustrates display element associated with a temporal overlay including sequence data points in accordance with various embodiments.

With reference to FIG. 9, overlays may include a variety of further aspects. For instance, a further arrangement of display elements 11 may further comprise a directional overlay 13. A directional overlay 13 may comprise visual indicators associated with a navigable path 12 (FIG. 1). The visual indicators may be arranged within the directional overlay 13 to indicate on a display of a user device 200 a route to a point of interest, area of interest, or collection of interest, such as a point of interest 8. Furthermore, with reference to FIG. 10, overlays may include an arrangement of display elements 11 comprising a temporal overlay 15. A temporal overlay 15 may comprise display elements 11 representing points in time and locations associated with an activity at each point in time. For example, a series of sequence data points, such as a first, second, third, and fourth sequence data point 17-1, 17-2, 17-2, and 17-4 may be depicted, such as to show within a field of view 16 (FIG. 1) the location of an animal within a zoo exhibit at different times during the day.

Figure 11:
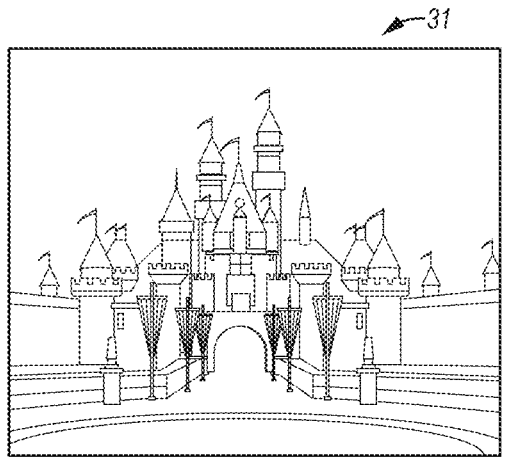
FIGS. 11-12 illustrates further display elements over a sensor input underlay, in accordance with various embodiments.
Figure 12:
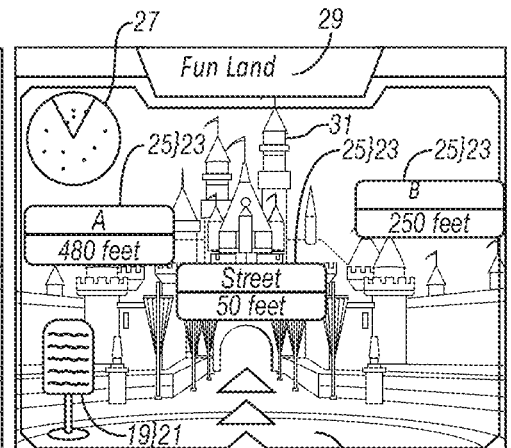

Moreover, various different types of overlays comprising display elements 11 may be combined. For instance, with reference to FIGS. 11 and 12, there may exist a sensor input underlay 31, such as a video feed from a camera of a user device 200 and atop this sensor input underlay 31, there may exist a variety of overlays. While certain overlays have already been discussed, further overlays are depicted in FIG. 12.

For example, there may exist an activity overlay 19. An activity overlay 19 comprises one or more visual depiction of interactive targets 21 (e.g., virtual items) disposed throughout an area. The user device 200 may interact electronically with the interactive targets 21, for instance, by playing audio associated with a location of a historical marker, or by awarding points associated with a virtual scavenger hunt item, and/or the like, upon approach by the user device 200 to within a distance from the interactive target 21.

Furthermore, there may exist a target location overlay 23. The target location overlay 23 may be created on a display of a user device 200 receiving data from a backend system 500 depicting tags associated with areas of interest, points of interest and collections of interest. For example, a target location overlay 23 may comprise one or more site bubble 25. A site bubble 25 may comprise a textual and/or graphical indication that in various embodiments identifies in human readable form an area of interest, a point of interest or a collection of interest, and optionally, further information related thereto, such as a calculated distance therefrom.

Moreover, there may exist an overview overlay 27. An overview overlay 27 may comprise a visual depiction of the relative locations of points of interest, areas of interest, and collections of interest and the orientation thereof with respect to a direction of view 18 (FIG. 1).

Finally, it may be determined that a user device 200 is within a first distance of a point of interest, an area of interest, or a collection of interest. Thus, because there is no place remotely disposed from the user device 200 to associate a representative tag, instead a target identification overlay 29 may be provided comprising visual depiction of the current point of interest, area of interest, and/or collection of interest being occupied by the user device 200, for instance, a text string providing an associated tag.

Figure 13:
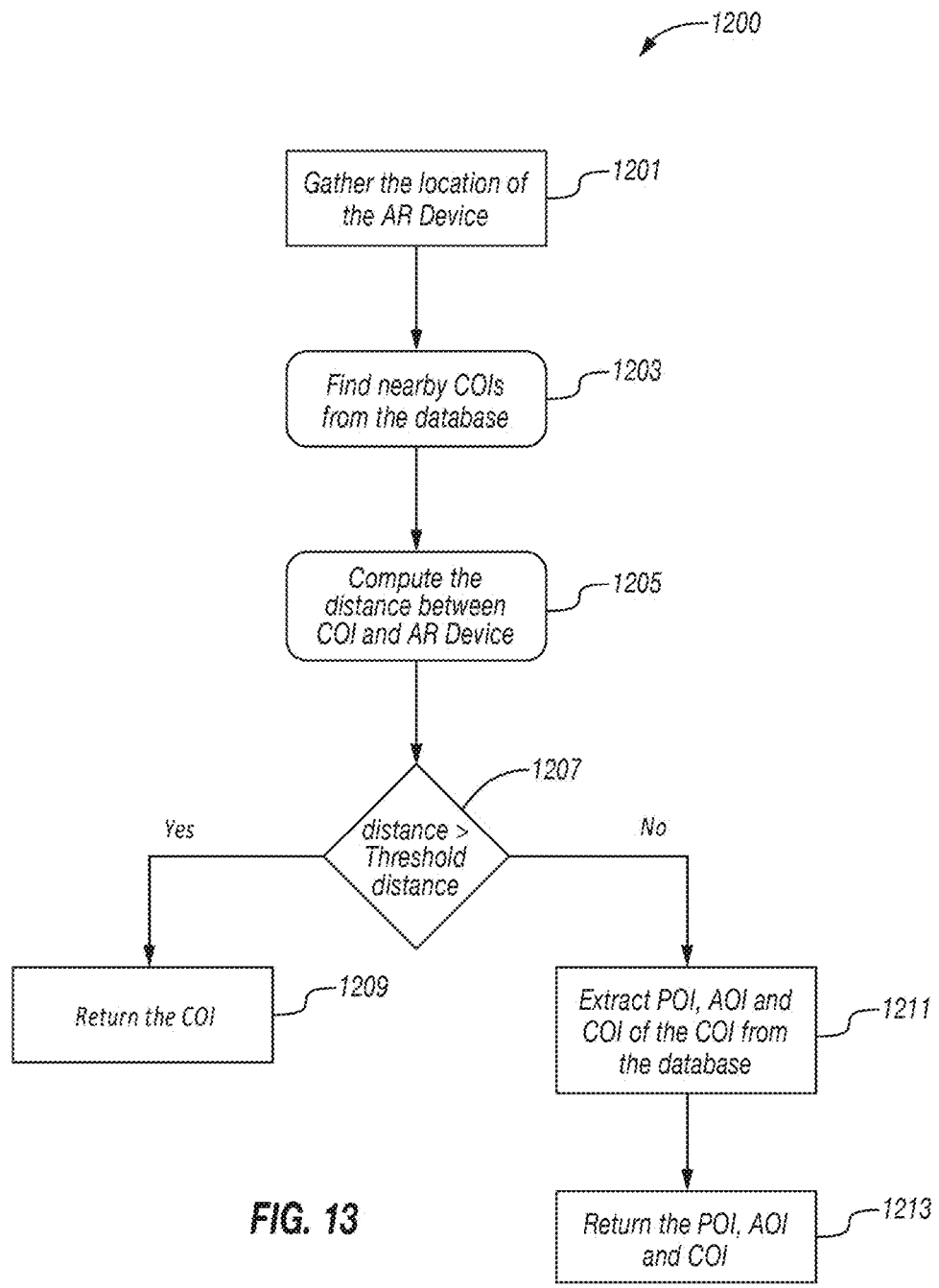
FIG. 13 illustrates an augmented reality map method, in accordance with various embodiments.

Having discussed an augmented reality mapping system 3 and various different arrangements of display elements 11 associated with such a system, attention is now directed to FIGS. 1-12 as well as FIG. 13, for a discussion of an augmented reality mapping method 1200. In various embodiments, an augmented reality mapping method 1200 may comprise, for example, calculating a location of a user device 200 (step 1201). For instance, a user device 200 operating within a context environment 2 may have a first sensor 210-1 comprising a GPS sensor and a second sensor 210-2 comprising a compass. The processor 204 of the user device 200 may interoperate with the GPS sensor and the compass such as by polling and/or interrupt handling to collect data representative of a location and/or a direction of view 18. In various embodiments this data is storable in a local data store 206. The processor 204 instantiates a session with the backend transceiver 212, which transmits the data representative of the location of the user device 200 to a backend system 500 via a network 400.

Subsequently, the augmented reality mapping method 1200 may continue with finding nearby collections of interest (step 1203). By "nearby," one may mean that these collections of interest are within a first threshold distance from the location of the user device 200. For instance, the backend system 500 may receive the data representative of the location of the user device 200 by a user device transceiver 502. The user device transceiver 502 may provide this data to a backend processor 504, which may query the remote data store 508, and specifically, the COI database 518 of the remote data store 508. The remote data store 508 thus returns an identification of collections of interest within a first threshold distance from the user device 200 location. In various instances, the first threshold distance is set via a stored value that is preset, and in further instances, the first distance is provided by a user 100 of the user device 200.

The augmented reality mapping method 1200 may continue with computing the distance between the collection of interest and the user device 200 (step 1205). For instance, the backend system 500, and specifically the backend processor 504 may compare the data representative of a location to retrieved data from the COI database 518 representative of the location of the collection of interest and compute a difference. In further instances, the backend system 500, and specifically, the backend processor 504 may compare the data representative of a location to retrieved data associated with further locations within the collection of interest, and compute a distance. In further instances, the computation(s) may be performed by a user device processor 204, as may be desired.

The augmented reality mapping method 1200 further may continue by a determination of whether the computed distance is within a second threshold distance from the user device 200 location (step 1207). In response to the distance being greater than the second threshold, the collection of interest may be determined to be too far from the user device 200 for each constituent COI, AOI, or POI therein (e.g., constituent element) be depicted by a display element 11 (FIG. 1) (step 1209) and instead the remotely disposed backend processor 504 directs the user device 200 to display a display element 11 representative of single tag associated with the collection of interest. In further instances, in response to the distance being within a third threshold distance (which may be equal to, greater than, or less than the second threshold distance as desired to provide hysteresis and ameliorate rapid switching/race states of display elements), the collection of interest and/or a constituent element thereof may be determined to be sufficiently near to the user device 200 for one or more constituent element to be associated with its own tag. For example, the backend processor 504 may query the POI inside COI database 520, the AOI inside COI database 522, and the COI inside COI database 523 to return one or more point of interest, area of interest and further collection of interest within the collection if interest, a tag associated with each of which to be depicted by a display element 11. Thus, the backend processor 504 of the backend system 500 may direct a user device transceiver 502 to transmit to the user device 200 an overlay including tags associated with the AOI, POI, and/or COI within the collection of interest (step 1213).

As used herein "controller" or "processor" mean any device capable of receiving and/or processing an electronic message, such as a computer or processor, or a set of computers/processors, although other types of computing units or systems may be used, including laptops, notebooks, hand held computers, personal digital assistants, cellular phones, smart phones (e.g., iPhone®, BlackBerry®, Android®, etc.) tablets, wearables (e.g., smart watches and smart glasses), or the like.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptography systems.

In various embodiments, storage aspects, such as memories may be local, while in further embodiments, they may be distributed. Moreover, both local and distributed storage aspects may interact with third-party storage aspects, and may be configured for storage and/or processing of big data sets. As used herein, big data may refer to partially or fully structured, semi-structured, or unstructured data sets including millions of rows and hundreds of thousands of columns. A big data set may be compiled, for example, from a history over time, from web registrations, from social media, from internal data, or from other suitable sources. Big data sets may be compiled with or without descriptive metadata such as column types, counts, percentiles, or other interpretive-aid data points.

In various embodiments, individual aspects represented in the figures may comprise a plurality of nodes. Nodes may comprise same or similar computers or processors which may be distributed geographically in different locations, housed in the same building, and/or housed in the same rack. Nodes may also be configured to function in concert to provide storage space and/or processing power greater than one of a node might provide alone. Data may be collected by nodes individually and compiled or in concert and collated. Data may further be compiled into a data set and formatted for use.

In various embodiments, data may be collected from multiple sources and amalgamated into a big data structure such as a file, for example. In that regard, the data may be used as an input to generate metadata describing the big data structure itself, as well as the data stored in the structure.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YouTube®, AppleTV®, Pandora®, xBox®, Sony® Playstation®), a uniform resource locator ("URL"), a document (e.g., a Microsoft Word® document, a Microsoft Excel® document, an Adobe .pdf document, etc.), an "ebook," an "emagazine," an application or microapplication (as described herein), an SMS or other type of text message, an email, Facebook, twitter, MMS and/or other type of communication technology. In various embodiments, a channel may be hosted or provided by a data partner. In various embodiments, the channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and/or a mobile device communication. Examples of social media sites include Facebook®, Foursquare®, Twitter®, MySpace®, LinkedIn®, and the like. Examples of affiliate or partner websites include American Express®, Groupon®, LivingSocial®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. As those skilled in the art will appreciate, user computer may include an operating system (e.g., Windows NT®, Windows 95/98/2000®, Windows XP®, Windows Vista®, Windows 7®, OS2, UNIX®, Linux®, Solaris®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, and optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware to perform the functions described herein will be apparent to persons skilled in the relevant art(s).

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://dx.doi.org/10.6028/NIST.SP.800-145 (last visited August 2017), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VB Script or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An augmented reality mapping method comprising:
   determining, by a location sensor, a location of a user device;
   providing, to a processor by a database, data representative of a collection of interest comprising a plurality of locations of interest within a threshold distance from the location of the user device to the processor,
   wherein a location of interest of the plurality of locations of interest comprises at least one of a point of interest, an area of interest, and a collection of interest;
   wherein the collection of interest comprises a data set associated with further locations of interest within the threshold distance from the location of the user device;
   computing, by the processor, a distance between a further location of interest within the threshold distance and the location of the user device;
   determining, by the processor whether the distance is within a second threshold distance;
   in response to the distance being greater than the second threshold distance, directing, by the processor, a user interface of the user device to display a tag associated with the collection of interest; and
   monitoring by the user device the location sensor for an indication of a change in the location of the user device;
   in response to detecting by the user device the indication of the change in the location of the user device, computing by the processor a second distance between the further location of interest within the threshold distance and the location of the user device subsequent to the change in the location;

in response to the distance subsequent to the change in the location being lesser than a third threshold distance, directing, by the processor, the user interface of the user device to display a tag associated with a location of interest within the plurality of locations of interest.

2. The augmented reality mapping method of claim 1, wherein the processor comprises a backend system processor of a backend system remotely disposed from the user device.

3. The augmented reality mapping method of claim 1, wherein the third threshold distance is greater than the second threshold distance.

4. The augmented reality mapping method of claim 1, wherein the third threshold distance is less than the second threshold distance.

5. The augmented reality mapping method of claim 1, wherein the collection of interest contains at least one of: at least one point of interest, at least one area of interest, and at least one further collection of interest.

6. The augmented reality mapping method of claim 1, wherein the location sensor is selected from a group comprising: a GPS sensor, a radio signal strength detector sensor.

7. The augmented reality mapping method of claim 1,
wherein, in response to a user interaction with the user device, directing, by the processor, the user interface of the user device to display the tag associated with the further location of interest and hide the tag associated with the collection of interest, and
wherein, in response to a second user interaction with the user device, directing, by the processor, the user interface of the user device to display the tag associated with the collection of interest and hide the tag associated with the further location of interest.

8. The augmented reality mapping method of claim 1, wherein the providing, by the database, data representative of the collection of interest further comprises:
receiving, by a user device transceiver of a backend system, data representative of the location of the user device;
providing, by the user device transceiver, the data to a backend system processor;
querying, by the backend system processor, a remote data store comprising a collection of interest database;
returning, by the remote data store an identification of collections of interest within the first threshold distance from the location of the user device, wherein the first threshold distance is set via a stored value;
providing, by the remote data store, data representative of the collection of interest comprising the plurality of locations of interest within the first threshold distance from the location of the user device to the processor.

9. The augmented reality mapping method of claim 1, wherein the computing the distance between the further location of interest within the threshold distance and the location of the user device comprises comparing data representative of the location of the user device to retrieved data from a collection of interest database and calculating a difference.

10. The augmented reality mapping method of claim 1, further comprising depicting, by the user device, an overview overlay comprising a visual depiction of relative locations of points of interest and orientations thereof with respect to a direction of view.

11. The augmented reality mapping method of claim 1, further comprising depicting, by the user device, a directional overlay comprising visual indicators associated with a navigable path to indicating a route to the at least one of the further location of interest.

12. An augmented reality mapping system comprising:
a user device comprising a GPS sensor configured to detect a location of the user device operating within a context environment;
a transceiver configured to receive from a database, data representative of a collection of interest,
wherein the collection of interest comprises a data set associated with further locations within a first threshold distance from the location of the user device;
a user device processor configured to receive a computed distance between a further location within the first threshold distance and the location of the user device and an indication of whether the computed distance is within a second threshold distance;
a user interface configured, in response to the computed distance being greater than the second threshold distance, to be directed by a processor to display a tag associated with the collection of interest,
wherein the user device monitors the GPS sensor for an indication of a change in the location of the user device,
wherein, in response to detecting by the user device the indication of the change in the location of the user device, the processor receives a computed second distance between the further location within the threshold distance and the location of the user device subsequent to the change in the location, and
wherein, in response to the computed second distance subsequent to the change in the location being lesser than a third threshold distance, the processor directs the user interface of the user device to display a tag associated with a point of interest within a plurality of points of interest.

* * * * *